United States Patent
Kommate et al.

(10) Patent No.: US 8,615,211 B2
(45) Date of Patent: Dec. 24, 2013

(54) METHOD FOR SPECTRUM SENSING AND COMMUNICATION DEVICE

(75) Inventors: Jitvanichphaibool Kommate, Singapore (SG); Ying Chang Liang, Singapore (SG); Yong Hong Zeng, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 13/575,360

(22) PCT Filed: Jan. 25, 2011

(86) PCT No.: PCT/SG2011/000030
§ 371 (c)(1),
(2), (4) Date: Oct. 15, 2012

(87) PCT Pub. No.: WO2011/093797
PCT Pub. Date: Aug. 4, 2011

(65) Prior Publication Data
US 2013/0045703 A1     Feb. 21, 2013

(30) Foreign Application Priority Data
Jan. 27, 2010    (SG) ............................... 201000576-7

(51) Int. Cl.
*H04B 17/00*     (2006.01)
(52) U.S. Cl.
USPC ............... 455/226.1; 455/226.2; 455/243.1; 455/442; 455/450; 455/452.1
(58) Field of Classification Search
USPC ..................................................... 455/226.1
See application file for complete search history.

(56) References Cited

U.S. PATENT DOCUMENTS

| | | | |
|---|---|---|---|
| 8,149,971 B2 * | 4/2012 | Hammerschmidt et al. | 375/349 |
| 2007/0058694 A1 * | 3/2007 | R. van Nee | 375/142 |

OTHER PUBLICATIONS

Noguet, Sensing Techniques for Cognitive Radio-State of the Art and Trends, IEEE SCC41-P1900.6, (2009).
Gardner, Measurement of Spectral Correlation, 34 IEEE Transactions on Acoustics, Speech, and Signal Processing, 1111 (1986).
Gardner, Exploitation of Spectral Redundancy in Cyclostationary Signals, 8 IEEE Signal Processing Magazine, 14 (1991).
Chen, et al., Spectrum Sensing Using Cyclostationary Properties and Applications to IEEE 802.22 WRAN, Proc. IEEE Global Communications Conference, 3133 (2007).

(Continued)

*Primary Examiner* — Ajibola Akinyemi
(74) *Attorney, Agent, or Firm* — K. David Crockett, Esq.; Niky Economy Syrengelas, Esq.; Crockett & Crockett, PC (57) ABSTRACT

A method for spectrum sensing is described comprising receiving a signal using a plurality of receive antennas; forming a set of received signals including the received signal of each antenna; determining a cyclic auto-correlation of the set of received signals; estimating, for each receive antenna, channel state information of the radio channel via which the receive antenna receives the signal based on the determined cyclic auto-correlation; performing maximum ratio combining of the received signal samples based on the estimated channel state information; determining a measure of the cyclostationarity of the received signal based on the result of the maximum ratio combining; and performing cyclostationarity detection spectrum sensing based on the determined measure of the cyclostationarity of the received signal.

18 Claims, 9 Drawing Sheets

(56) References Cited

OTHER PUBLICATIONS

Kim, et al., Cyclostationary Approaches to Signal Detection and Classification in Cognitive Radio, Proc. IEEE International Symp. New Frontiers Dynamic Spectrum Access Networks, 212 (2007).

Chen, et al., Spectral Correlation-Based Multi-Antenna Spectrum Sensing Technique, Proc. IEEE Wireless Communications and Networking Conference, 735 (2008).

Zhang, et al., Performance of Cyclostationary Features Based Spectrum Sensing Method in a Multiple Antenna Cognitive Radio System, Proc. IEEE Wireless Communications and Networking Conference, 1 (2009).

Mahapatra, et al., Cyclostationary Detection for Cognitive Radio with Multiple Receivers, IEEE International Symposium on Wireless Communication Systems, 493 (2008).

Sadeghi, et al., A Novel Primary User Detection Method for Multiple-Antenna Cognitive Radio, International Symposium on Telecommunications, 188 (2008).

Abdel-Samad, et al., Robust Transmit Eigen Beamforming Based on Imperfect Channel State Information, 54 IEEE Transactions on Signal Processing, 1596 (2006).

\* cited by examiner

METHOD FOR SPECTRUM SENSING AND COMMUNICATION DEVICE

FIELD OF THE INVENTION

Embodiments of the invention generally relate to methods for spectrum sensing and communication devices.

BACKGROUND OF THE INVENTION

A cognitive radio system operates in frequency channels that are licensed for a specific communication service. This specific communication service is typically referred to as the incumbent service, and existing users of the incumbent service are denoted as incumbent users or primary users. A user of the cognitive radio system may be referred to as a secondary user.

In a cognitive radio system, spectrum sensing is a crucial operation for the secondary user (SU) to detect whether a frequency band or a frequency channel licensed to the incumbent radio service is used by a primary user (PU). Spectrum sensing methods can be broadly categorized into three categories: matched filtering methods, energy detection methods, and cyclostationarity detection methods. Each method has its own advantages and disadvantages.

In case that all information about a signal that may be or may not be transmitted by a primary user (and for which it is to be detected whether it is currently transmitted) is known a priori, matched filtering is the optimum detection method (i.e. the optimum spectrum sensing method). However, since this method requires perfect knowledge of the primary user's transmission parameters such as used bandwidth, modulation type, pulse shaping method, frame format etc., the complexity of this method is considerably high for implementation.

For spectrum sensing based on energy detection, the primary user's transmission parameters are not required. Spectrum sensing methods based on energy detection have therefore the least complexity among the three spectrum sensing method categories. However, energy detection spectrum sensing methods are typically vulnerable to noise uncertainty. Inaccurate estimation of the noise power can be the reason for a SNR (signal to noise ratio) wall for the detection and to a high false alarm probability.

Recently, spectrum sensing based on cyclostationarity detection has attracted substantial interest due to its ability to distinguish among wireless systems that transmit signals having cyclostationarity. For example, wireless systems using different parameters such as different modulation types, symbol rates, carrier frequencies etc. show cyclostationary features at different cycle frequencies and may thus be distinguished. Signal detection for spectrum sensing can be performed by checking the presence of cyclostationary features at these cycle frequencies.

Since the spectrum sensing method based on cyclostationarity detection can be used for distinguishing between a signal transmitted by a primary user and interfering signals it may be beneficial for coexistence scenarios in cognitive radio which have been investigated for standardization.

It is therefore desirable to provide improved methods for spectrum sensing, in particular based on cyclostationarity detection.

SUMMARY OF THE INVENTION

In one embodiment, a method for spectrum sensing is provided comprising receiving a signal using a plurality of receive antennas; forming a set of received signals including the received signal of each antenna; determining a cyclic auto-correlation of the set of received signals; estimating, for each receive antenna, channel state information of the radio channel via which the receive antenna receives the signal based on the determined cyclic auto-correlation; performing maximum ratio combining of the received signal samples based on the estimated channel state information; determining a measure of the cyclostationarity of the received signal based on the result of the maximum ratio combining; and performing cyclostationarity detection spectrum sensing based on the determined measure of the cyclostationarity of the received signal.

According to one embodiment, the set of received signals is a received vector signal wherein the components of the received vector signal are the signals received via the antennas.

Determining the cyclic auto-correlation may include determining a cyclic auto-correlation matrix of the set of received signals. Estimating the channel state information of the radio channel may include determining eigenvalues of the cyclic auto-correlation matrix.

According to one embodiment, the channel state information is determined as the components of the eigenvector corresponding to the maximum eigenvalue of the cyclic auto-correlation matrix.

The cyclic auto-correlation is for example determined for a candidate cycle frequency.

According to one embodiment, the signal is received using the plurality of receive antennas to generate a plurality of received signal samples for each receive antenna.

Determining the cyclic autocorrelation for example includes determining the correlation between signal samples of different antennas for the same sampling time.

According to one embodiment, the measure of the cyclostationarity of the received signal is determined based on the cyclic spectral density function or the cyclic spectral coherence function.

According to one embodiment, the measure of the cyclostationarity of the received signal is determined based on the cyclic spectral density function scaled by an average energy of the received signal.

Determining the measure of the cyclostationarity may include an averaging over a plurality of radio frequencies or determining the maximum over a plurality of radio frequencies.

Cyclostationarity detection spectrum sensing is for example performed by comparing the measure of cyclostationarity with a pre-determined threshold. For example, it is decided that a primary user is present if the measure of cyclostationarity is above the pre-determined threshold.

According to one embodiment, a method for spectrum sensing is provided comprising receiving a signal using a plurality of receive antennas; determining for each receive antenna a measure of the cyclostationarity of the received signal of the antenna; combining the measures of the cyclostationarity of all receive antennas; and performing cyclostationarity detection spectrum sensing based on the combined measures of the cyclostationarity of all receive antennas.

Combining the measures of cyclostationarity may for example include summing the measures of cyclostationarity.

Performing cyclostationarity detection spectrum sensing for example includes determining an overall measure of cyclostationarity from the combined measures of cyclostationarity and comparing the overall measure of cyclostationarity with a pre-determined threshold.

According to one embodiment, a communication device corresponding to one of the methods described above is provided. Further, computer program products which, when executed by a computer, make the computer perform the above methods may be provided.

SHORT DESCRIPTION OF THE FIGURES

Illustrative embodiments of the invention are explained below with reference to the drawings.

DETAILED DESCRIPTION

Figure 1:
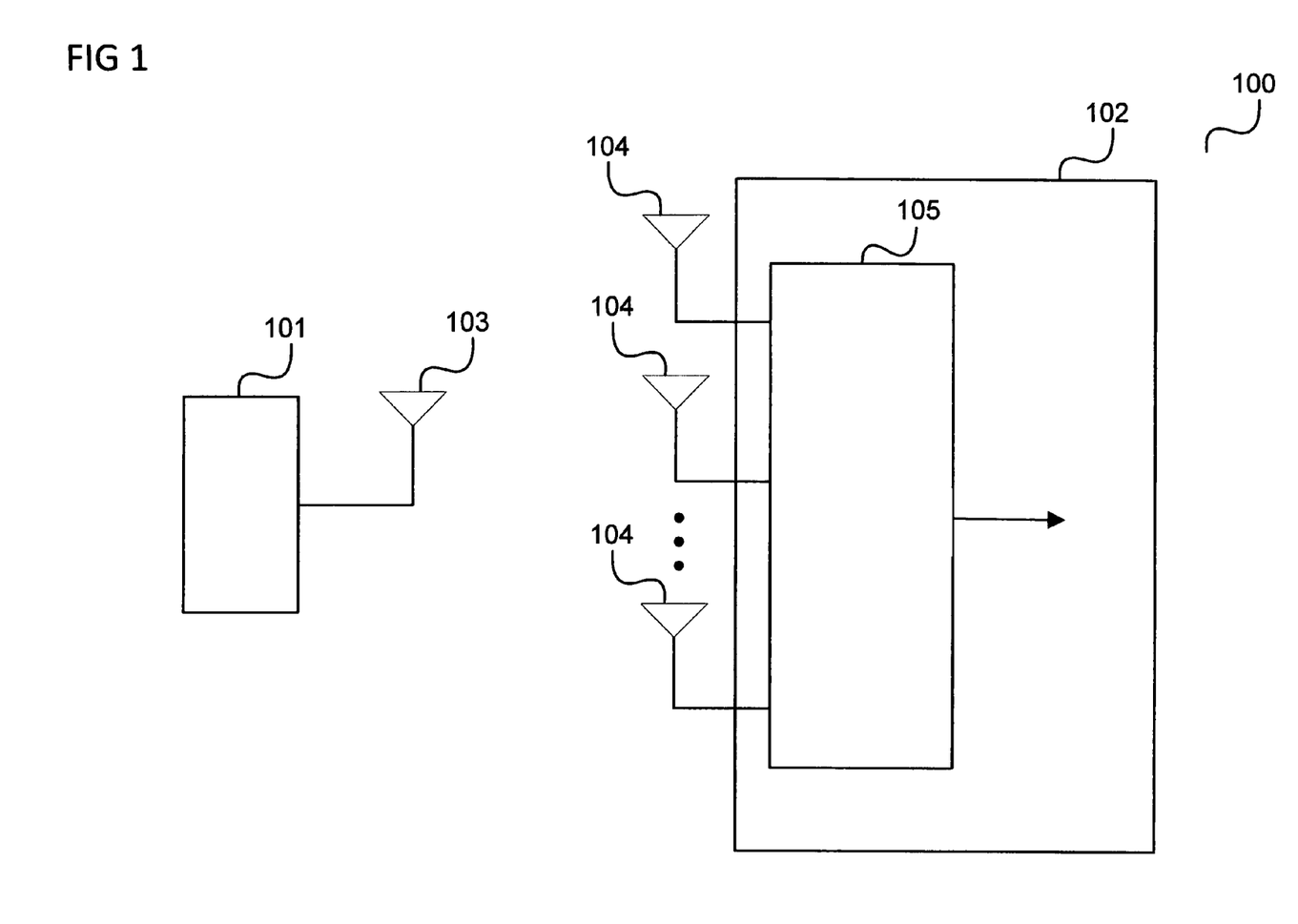
FIG. 1 shows a communication arrangement according to an embodiment.

FIG. 1 shows a communication arrangement 100 according to an embodiment.

The communication arrangement 100 includes a first communication device 101 and a second communication device 102.

The first communication device 101 is assumed to be a communication device of an incumbent system, i.e. a communication device of a communication system operating in a frequency region that is licensed for the communication system.

The first communication device 101 includes a transmit antenna 103 and may or may not transmit a sending signal s(t) using the transmit antenna.

The second communication device 102 is assumed to be a communication device of a cognitive radio system, i.e. of radio communication system operating in the same frequency region as the first communication device 101. Since the frequency region is licensed to the communication system of which the first communication device 101 is part, the second communication device 102 needs to perform spectrum sensing to make sure that the first communication device 101 is not using the frequency region, i.e. is not transmitting signal s(t), before using the frequency region itself, e.g. before sending a transmit signal using the frequency region itself.

The second communication device 102 comprises a plurality of receive antennas 104 which are set to receive in the frequency region.

In this example, it is assumed that the second communication device 102 includes M receive antennas which are numbered from 0 to M−1. The signal received by the mth receive antenna (m=0, . . . , M−1) is denoted by $y_m(t)$.

The vector of received signals $$y(t) = \begin{pmatrix} y_1(t) \\ y_2(t) \\ \vdots \\ y_M(t) \end{pmatrix}$$

which may also be seen as the overall received signal or as the set of received signals (if the ordering is not considered), is fed to a spectrum sensing circuit 105 which determines whether the first communication device transmits the signal s(t) by deciding whether the signal s(t) is present in the received signal y(t) or not.

The channel state information (CSI) of the communication channel between the transmit antenna 103 and the mth receiving antenna 104 is given by the channel impulse response $h_m$.

In case that the signal s(t) is transmitted, the received signal y(t) is thus given by $$y(t) = hs(t) + w(t)$$

wherein $$h = \begin{pmatrix} h_1 \\ h_2 \\ \vdots \\ h_M \end{pmatrix} \text{ and } w(t) = \begin{pmatrix} w_1(t) \\ w_2(t) \\ \vdots \\ w_M(t) \end{pmatrix}$$

where $w_m(t)$ is the additive noise at the mth antenna.

The spectrum sensing circuit 105 outputs the result of this decision (also referred to as the detection result) based on which the second communication device 102 is for example controlled to use the frequency region (if it has been decided that s(t) is not present in the received signal) or to not use the frequency region (if it has been decided that s(t) is present in the received signal).

Figure 2:
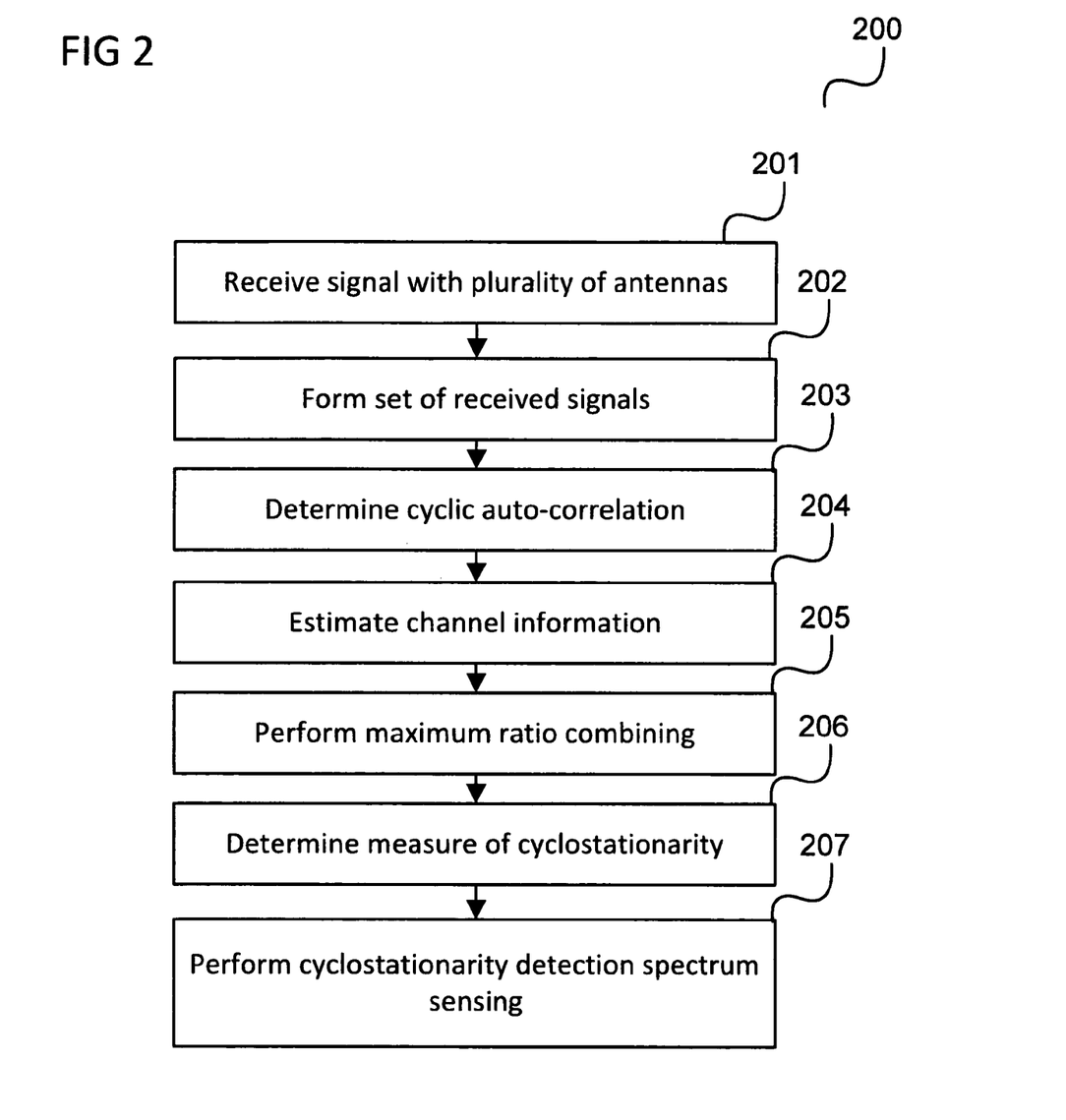
FIG. 2 shows a flow diagram according to an embodiment.

According to one embodiment, the second communication device 102 for example carries out a method for spectrum sensing as illustrated in FIG. 2.

FIG. 2 shows a flow diagram 200 according to an embodiment.

In 201, a signal is received using a plurality of receive antennas.

In 202, a set of received signals is formed including the received signal of each antenna.

In 203, a cyclic auto-correlation of the set of received signals is determined.

In 204, for each receive antenna, channel state information of the radio channel via which the receive antenna receives the signal is estimated based on the determined cyclic auto-correlation.

In 205, maximum ratio combining of the received signal samples is performed based on the estimated channel state information.

In 206, a measure of the cyclostationarity of the received signal is determined based on the result of the maximum ratio combining.

In 207, cyclostationarity detection spectrum sensing is performed based on the determined measure of the cyclostationarity of the received signal.

In one embodiment, in other words, signal samples of different receiving antennas are combined to estimate the channel state information and a maximum ratio combining is carried out based on the estimated channel state information (i.e. a blind maximum ratio combining is carried out). Based on the result of the blind maximum radio combining, cyclostationarity detection is performed, i.e. it is determined whether a signal of a primary user is present in the received signal.

Figure 3:
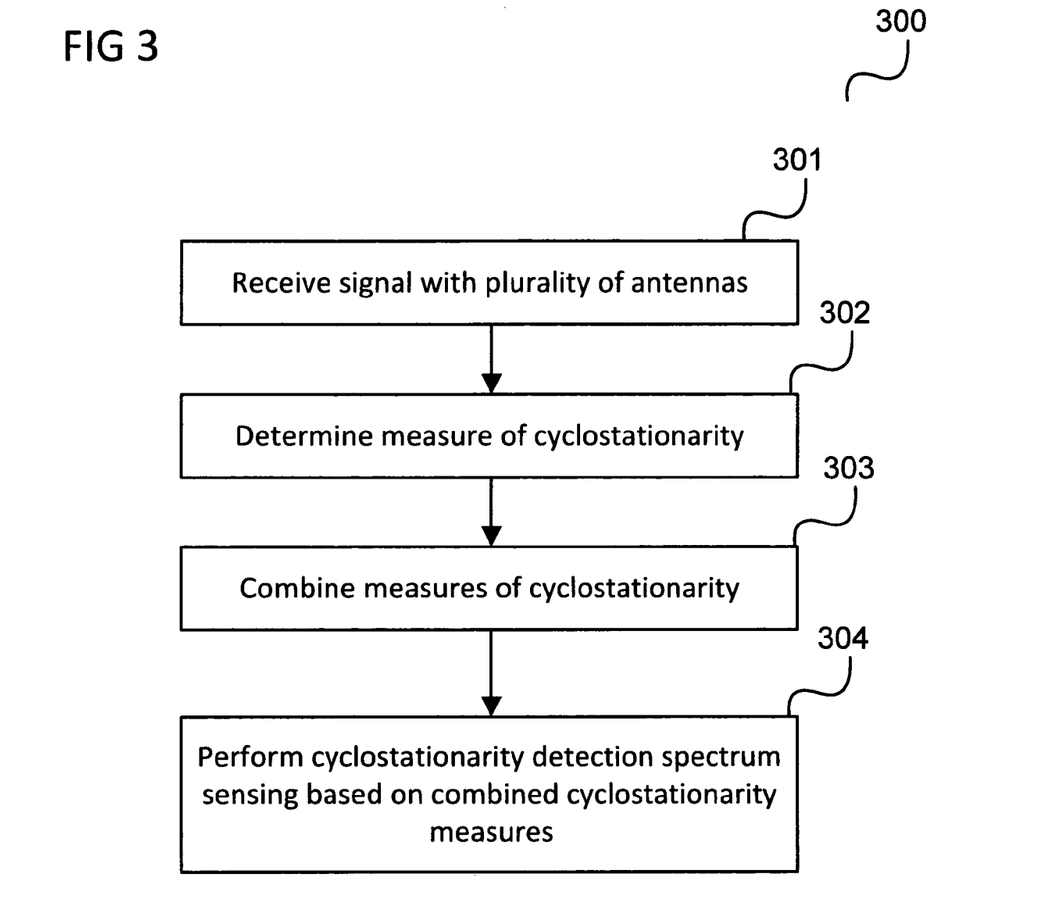
FIG. 3 shows a flow diagram according to an embodiment.

According to one embodiment, the second communication device 102 for example carries out a method for spectrum sensing as illustrated in FIG. 3.

FIG. 3 shows a flow diagram 300 according to an embodiment.

In 301, a signal is received using a plurality of receive antennas.

In 302, for each receive antenna a measure of the cyclostationarity of the received signal of the antenna is determined.

In 303, the measures of the cyclostationarity of all receive antennas are combined.

In 304, cyclostationarity detection spectrum sensing is performed based on the combined measures of the cyclostationarity of all receive antennas.

According to one embodiment, in other words, cyclostationarity is measured or determined for the received signal as received by each antenna, the results are combined and based on the combination it is decided whether a signal of a primary user is present in the received signal.

The second communication device 102 may for example include corresponding circuits for carrying out the steps of the methods described above with reference to FIGS. 2 and 3 (e.g. as part of the spectrum sensing circuit 105).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set. Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

It should be noted that embodiments described in context of one of the methods described with reference to FIGS. 2 and 3 (or corresponding communication devices) are analogously valid for the other method and the communication devices carrying out these methods.

The methods described above with reference to FIGS. 2 and 3 may be seen to be spectrum sensing methods based on cyclostationarity detection, i.e. may be seen to exploit the cyclostationary property of a signal transmitted by a primary user.

A signal x(t) may be said to exhibit cyclostationarity (or be cyclostationary) if its statistic properties are periodic in time. For a given $\alpha$ and time lag $\tau$ the expression $$R_x^\alpha(\tau) = \lim_{\Delta t \to \infty} \frac{1}{\Delta t} \int_{-\frac{\Delta t}{2}}^{\frac{\Delta t}{2}} x\left(t + \frac{\tau}{2}\right) x^*\left(t - \frac{\tau}{2}\right) e^{-j2\pi\alpha t} dt$$

may be called the cyclic autocorrelation function (AF). If there exists at least one nonzero $\alpha$ such that $$\max_\tau |R_x^\alpha(\tau)| > 0$$

is satisfied, we may say that x(t) exhibits cyclostationarity.

It should be noted that $R_x^\alpha(t)$ can analogously be defined for a signal vector x(t) (e.g. a received signal vector such as y(t) as given above) by having within the integral the matrix product of the signal vector (at time $$t + \frac{\tau}{2})$$

with the hermitian conjugate of the signal vector (at time $$t - \frac{\tau}{2})$$

thus having a matrix within the integral and determining the value of the integral and the limit component-wise. In this case, with x being a vector, $R_x^\alpha(\tau)$ is also referred to as the cyclic AF matrix of x(t).

Further, it should be noted that $R_x^\alpha(t)$ may accordingly be determined for a signal x(t) that is available as a sequence of signal samples x(0), ..., x(N−1) according to $$R_x^\alpha(\tau) = \frac{1}{N} \sum_{n=0}^{N-1} x(n) x^*(n - \tau) e^{-j2\pi\alpha n T_s}$$

where $T_s$ is the sample duration, i.e. the time between two samples.

The nonzero $\alpha$ is called a cycle frequency of x(t). The value of $\alpha$ depends on the type of modulation, the symbol rate, etc. according to which the signal x(t) is generated. For binary phase shift keying (BPSK) signals cyclostationary features exist at (i.e. there are cycle frequencies) $\alpha = k/T_b$ and $\alpha = 2f_c \pm k/T_b$ where $T_b$ is the symbol duration, $f_c$ is the carrier frequency, and k is an integer.

Taking the Fourier transform of the cyclic autocorrelation function the cyclic spectral density function (SDF) is obtained as $$S_x^\alpha(f) = \int_{-\infty}^{\infty} R_x^\alpha(\tau) e^{-j2\pi f \tau} d\tau.$$

Normalizing the cyclic SDF with a geometric mean composed of two cyclic SDFs at $\alpha=0$ for $f+\alpha/2$ and $f-\alpha/2$ gives the cyclic spectral coherence function (SCF)

$$\rho_x^\alpha(f) = \frac{S_x^\alpha(f)}{\sqrt{S_x(f + \alpha/2) S_x(f - \alpha/2)}}$$

where $S_x(f)$ represents the cyclic SDF at $\alpha=0$.

The cyclic SDF may be estimated using the frequency averaging method or the time-averaging method.

A cyclostationary feature that is widely used in spectrum sensing methods is the cyclic spectral density function. The cyclic spectral coherence function may be used for modulation classification and may also be used for signal detection.

Since multi-antenna systems are widely implemented in current communication systems, efficient spectrum sensing methods for such systems are of particular interest. For example, equal gain combining (EGC) may be used for cyclostationarity based spectrum sensing employing multiple antennas. The cross cyclic spectral density function may be used to estimate the phase difference between different antennas.

According to one embodiment, the cyclic spectral coherence function $\hat{\rho}_x^\alpha(f)$ is used as a cyclostationary feature wherein the hat is meant to indicate that an estimation of the cyclic spectral coherence function is determined and used for spectrum sensing. It should be noted that the cyclic spectral coherence function has the built-in ability to handle noise uncertainty.

According to one embodiment, a modified spectral density function (MSDF) given by $$T_x^\alpha(f) = \frac{S_x^\alpha(f)}{\varsigma_x}$$

is used as cyclostationary feature wherein the denominator $\varsigma_x$ is the average energy of the signal x(t), i.e. is the average of the energies of the signal over time t.

Using this cyclostationary feature avoids having the problem of having null in the denominator of the cyclic spectral coherence function and may be determined with less computational complexity than the cyclic spectral coherence function.

From a cyclostationary feature as the ones above, a measure for cyclostationarity or an indicator for cyclostationarity may be determined, e.g. by taking the absolute value of the cyclostationary feature.

It should be noted that in practice, the SCF and the MSDF may be determined from discrete values of τ and for discrete frequencies and by performing a discrete Fourier transform for determining the spectral density function.

Maximum ratio combining (as for example used according to the method illustrated in FIG. 3) may be seen to be superior to equal gain combining and may be applied to the combination of the received signals of all antennas. However, it is an unrealistic assumption that the properties of the channel between the primary user and the secondary user are known.

Therefore, according to one embodiment, an eigen-based blind channel estimation exploiting a cyclostationary feature is used according to one embodiment.

Further, the assumption that noise samples are temporally/spatially uncorrelated is not practical in many cases. According to embodiments, sensing methods are provided that can be used in uncorrelated and temporally/spatially correlated noise scenarios and that can handle the problem of noise uncertainty.

Figure 4:
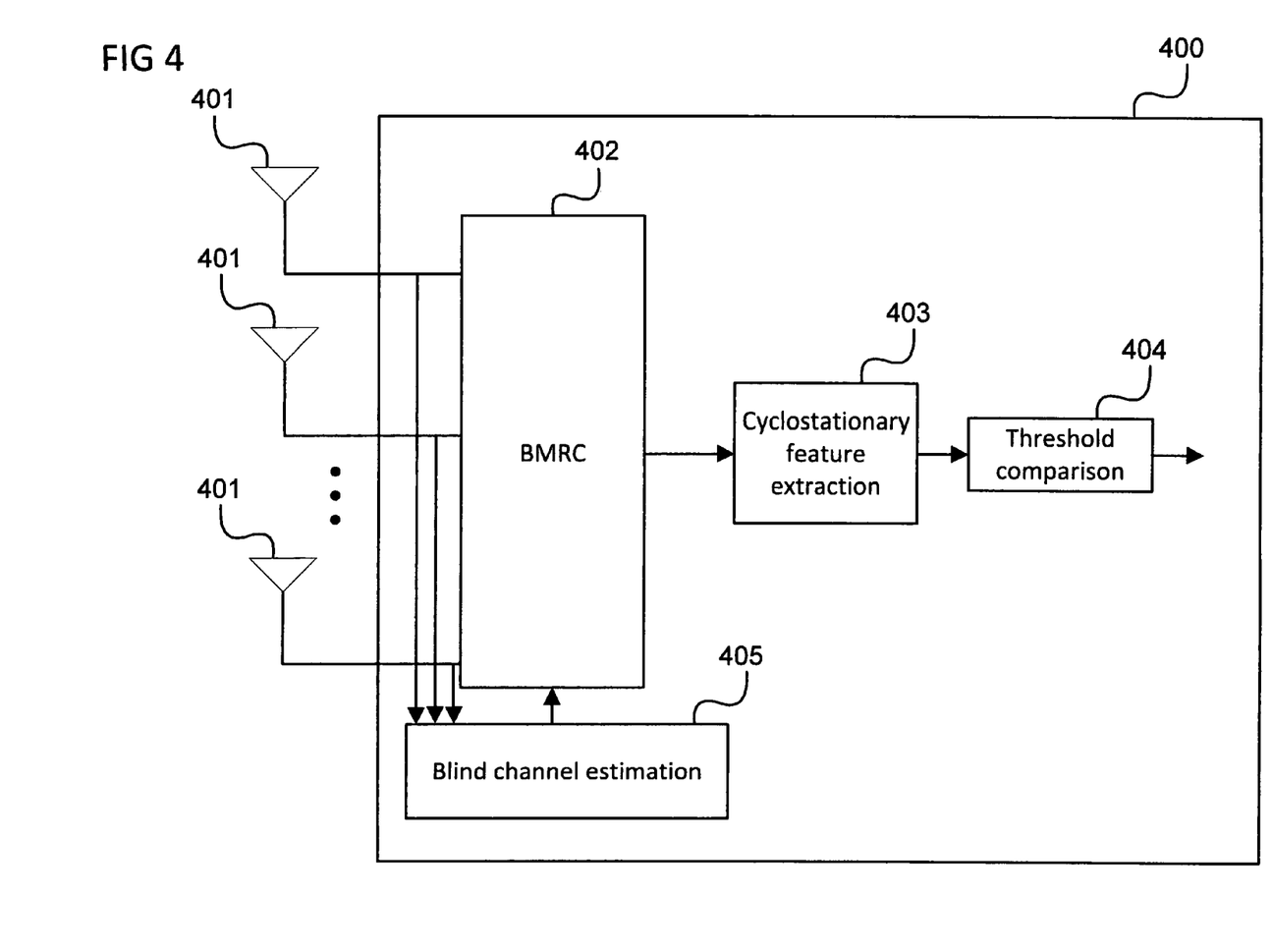
FIG. 4 shows a communication device according to an embodiment.

According to one embodiment, the method illustrated in FIG. 2 is a pre-combining spectrum sensing method and is for example carried out by a communication device as illustrated in FIG. 4.

FIG. 4 shows a communication device 400 according to an embodiment.

The communication device 400 corresponds to the second communication device 102 illustrated in FIG. 1. Accordingly, it includes a plurality of receiving antennas as above numbered from 0 to M−1.

In this embodiment, the spectrum sensing circuit 105 is implemented by a BMRC (Blind Maximum Ratio Combining) circuit 402, a cyclostationary feature extraction circuit 403 and a comparator 404.

In this example, the communication device 400 operates according to a pre-combining method (in contrast to a post-combining method as described below). In a pre-combining method according to an embodiment, received signals $y_m(t)$ (m=0, ..., M−1) from all antennas 401 are combined first and then a cyclostationary feature of the resulting (overall) signal y(t) is extracted for detecting the presence of a signal transmitted by a primary user, e.g. the first communication device 101.

The communication device 400 further comprises a blind channel estimation circuit 405. The blind channel estimation circuit 405 carries out a blind channel estimation including the following Determining the signal sample cyclic autocorrelation function matrix as $$\hat{R}_y^\alpha(\tau_0) = \frac{1}{N} \sum_{n=0}^{N-1} y(n) y^H(n-\tau_0) e^{-j2\pi\alpha n T_s}$$

where y(n) denotes the column vector including the nth sample (n=0 ... N−1) of the overall received signal y(t), wherein N is the total number of samples and $T_s$ is the sample duration. $\hat{R}_y^\alpha(\tau_0)$ is used as estimation for the cyclic AF matrix $R_y^\alpha(\tau_0)$. $\tau_0$ is for example chosen so as to maximize the cyclic autocorrelation of the signal transmitted by the primary user (e.g. as it is expected from the primary user), e.g. as $$\tau_0 = \underset{\tau}{\operatorname{argmax}} |R_s^\alpha(\tau)|.$$

Applying singular value decomposition (SVD) on the estimated cyclic AF matrix $\hat{R}_y^\alpha(\tau_0)$.

Selecting an eigenvector corresponding to the maximum eigenvalue of the estimated cyclic AF matrix $\hat{R}_y^\alpha(\tau_0)$ as the estimated channel state information (CSI) $\hat{h}$ of the link between the primary user and the communication device 400.

The estimated channel information $\hat{h}$ is supplied by the blind channel estimation circuit 405 to the BMRC circuit 402.

The BMRC circuit 402 calculates the combining output $$z(n) = \frac{\hat{h}^H}{\|\hat{h}\|} y(n) \ (n=0, \ldots, N-1).$$

In other words, the normalized estimated channel vector is multiplied with the received signal vector to provide the BMRC output. The BMRC output is supplied to the cyclostationary feature extraction circuit 403.

The cyclostationary feature extraction circuit 403 calculates a cyclostationary feature of the received signal from z(n) (n=0, ..., N−1), e.g. the estimated cyclic SCF $\hat{\rho}_z^\alpha(f)$ or the modified SDF $T_z^\alpha(f)$.

The calculated cyclostationary feature is supplied to the comparator 404 which carries out a comparison with a threshold, e.g. by averaging the absolute value of the cyclostationary feature for all frequencies or determining the maximum of the absolute value of the cyclostationary feature for all frequencies and comparing the result with the threshold. Based on the result of this comparison, it is decided whether the signal s(t) is present in the received signal y(t).

For example, it is decided that the signal s(t) is present in the received signal y(t) if and only if $$\max_{f \in F} |\hat{\rho}_z^\alpha(f)| \geq \eta_1$$

(algorithm 1),
if and only if $$\underset{f \in F}{avg} |\hat{\rho}_z^\alpha(f)| \geq \eta_2$$

(algorithm 2) or
if and only if $$\underset{f \in F}{avg} |T_z^\alpha(f)| \geq \eta_3$$

(algorithm 3)
wherein the $\eta_i$ are respective thresholds and F is a set of frequencies in the supporting range (i.e. a set of frequencies for which spectrum sensing is performed).

Figure 5:
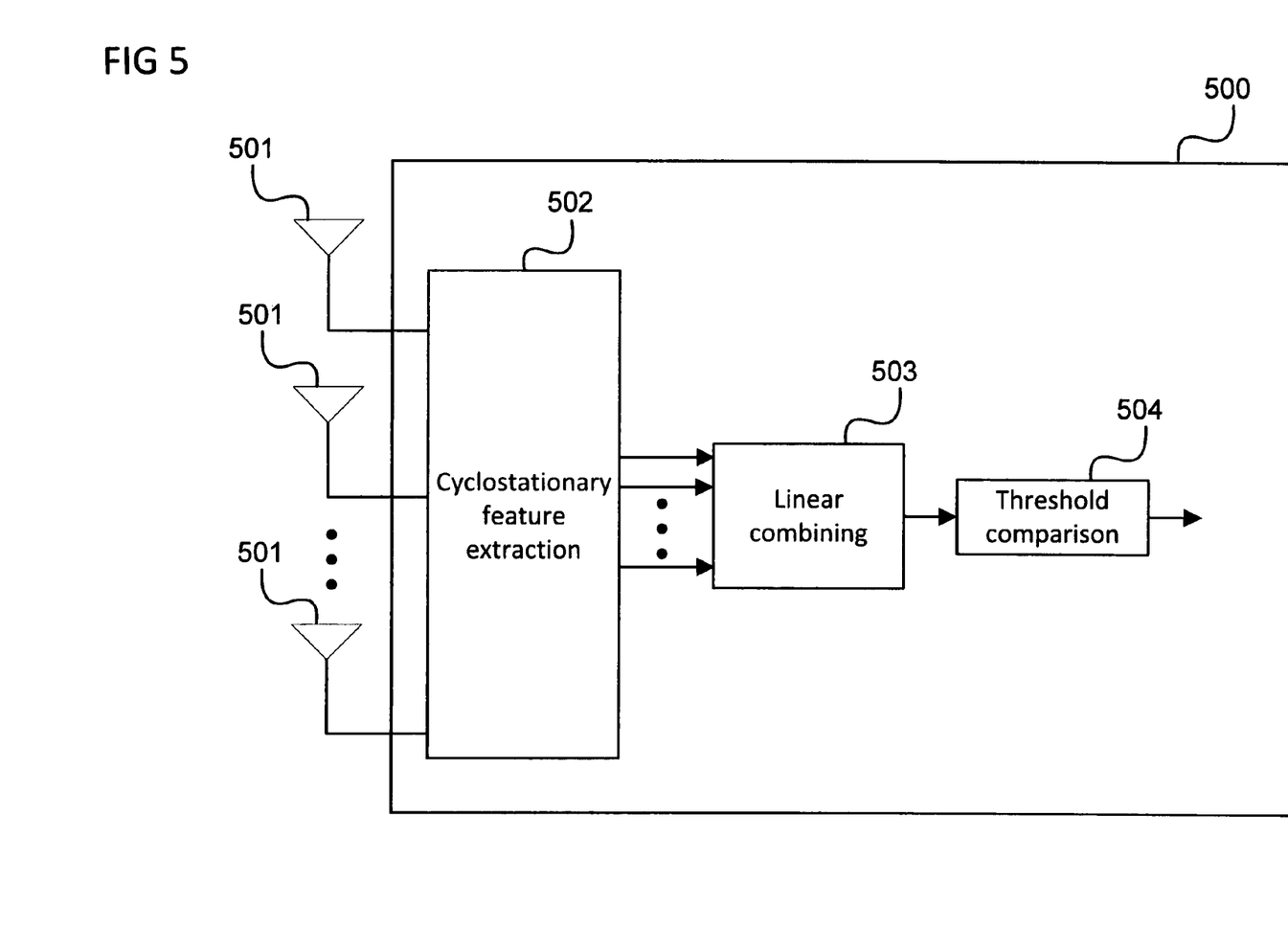
FIG. 5 shows a communication device according to an embodiment.

According to one embodiment, the method illustrated in FIG. 3 is a post-combining spectrum sensing method and is for example carried out by a communication device as illustrated in FIG. 5.

FIG. 5 shows a communication device 500 according to an embodiment.

The communication device 500 corresponds to the second communication device 102 illustrated in FIG. 1. Accordingly, it includes a plurality of receiving antennas as above numbered from 0 to M−1.

In this embodiment, the spectrum sensing circuit 105 is implemented by a cyclostationary feature extraction circuit 502, a linear combiner 503, and a comparator 504.

In this example, the communication device 500 operates according to a post-combining method (in contrast to a pre-combining method as described above).

According to a post-combining method according to an embodiment, the cyclostationary feature extraction circuit determines a cyclostationary feature (e.g. the estimated. SCF or the MSDF) for each antenna from $y_m(n)$ (n=0 ..., N−1), wherein m is the index of the antenna, N is the total number of samples (or sample times) and $y_m(n)$ is the nth sample of the signal received at the mth antenna.

The linear combiner 503 linearly combines the cyclostationary features for all antennas or of measures of the cyclostationarity for all antennas (such as the absolute values of the cyclostationarity features) and supplies the result to the comparator 504.

The comparator 504 performs a comparison of a resulting (e.g. an overall) measure of cyclostationary with a threshold. The measure of cyclostationarity that is compared is determined based on the output of the linear combiner 503, e.g. by averaging over a plurality of considered radio frequencies or determining the maximum for a plurality of considered radio frequencies. Based on the result of this comparison, it is decided whether the signal s(t) is present in the received signal y(t).

For example, it is decided that the signal s(t) is present in the received signal y(t)
if and only if $$\underset{f \in F}{\max} \sum_{m=1}^{M} |\hat{\rho}_{y_m}^\alpha(f)| \geq \eta_4$$

(algorithm 4),
if and only if $$\underset{f \in F}{avg} \sum_{m=1}^{M} |\hat{\rho}_{y_m}^\alpha(f)| \geq \eta_5$$

(algorithm 5) or
if and only if $$\underset{f \in F}{avg} \sum_{m=1}^{M} |T_{y_m}^\alpha(f)| \geq \eta_6$$

(algorithm 6)
wherein the $\eta_i$ are respective thresholds and F is a set of frequencies in the supporting range (i.e. a set of frequencies for which spectrum sensing is performed).

In FIGS. 6 to 9, simulations results are shown to illustrate the performance of the embodiments described with reference to FIGS. 4 and 5 and using the decision rules indicated as algorithms 1 to 6 above.

A flat fading channel is assumed for all simulations. Further, it is assumed that the primary user transmits a BPSK signal with a symbol duration of 25 μs at a carrier frequency of 80 kHz. The sampling rate used is 320 kHz. The number of observation samples (i.e. the number N above) is 4000. The false alarm probability is set to 0.1. To estimate the cyclic SDF, the time-averaging approach is employed. Unless otherwise stated, the number of antennas of the secondary user (i.e. the number M above) is 2.

Figure 6:
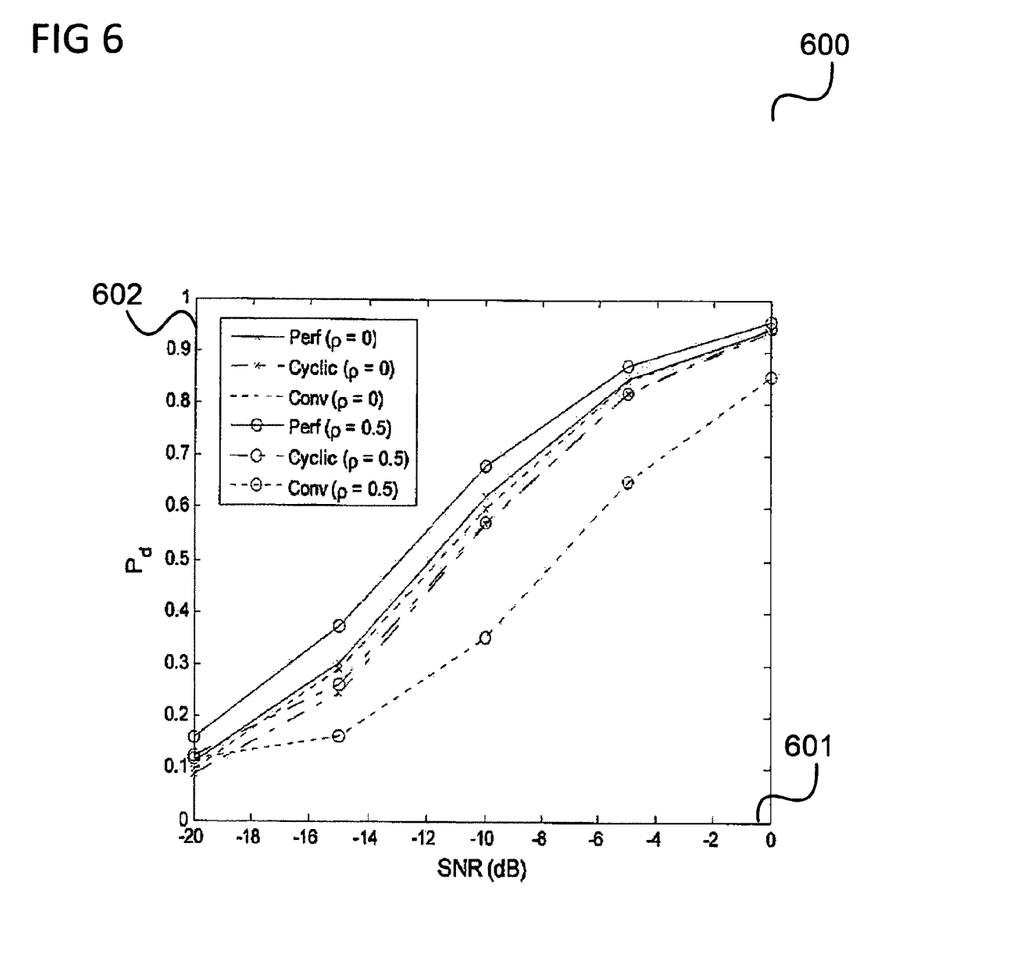
FIGS. 6 to 9 show performance diagrams.

FIG. 6 shows a performance diagram 600 according to an embodiment.

Signal-to-noise ratio (SNR) is indicated along a first axis 601 and detection probability is indicated along a second axis 602.

The diagram 600 shows the performance of the blind channel estimation in the spatially correlated noise scenario. The spatial correlation coefficient is defined as $\epsilon$. In the simulation $\epsilon$=0.5. For the cyclic AF $\tau_0$=4. The cyclic AF when $\tau_0$=0 and $\alpha$=0 is called the conventional AF. "Perf", "Cyclic", and "Conv" are used to indicate perfect estimation, blind estimation using the cyclic AF, and conventional AF, respectively. Only the results of the embodiment based on algorithm 3 are shown in the diagram 600. The results show that the blind channel estimation using the cyclic AF provides superior performance than employing the conventional AF when $\epsilon$ is not zero. When $\epsilon$=0 the cyclic AF and the conventional AF have comparable performance.

Figure 7:
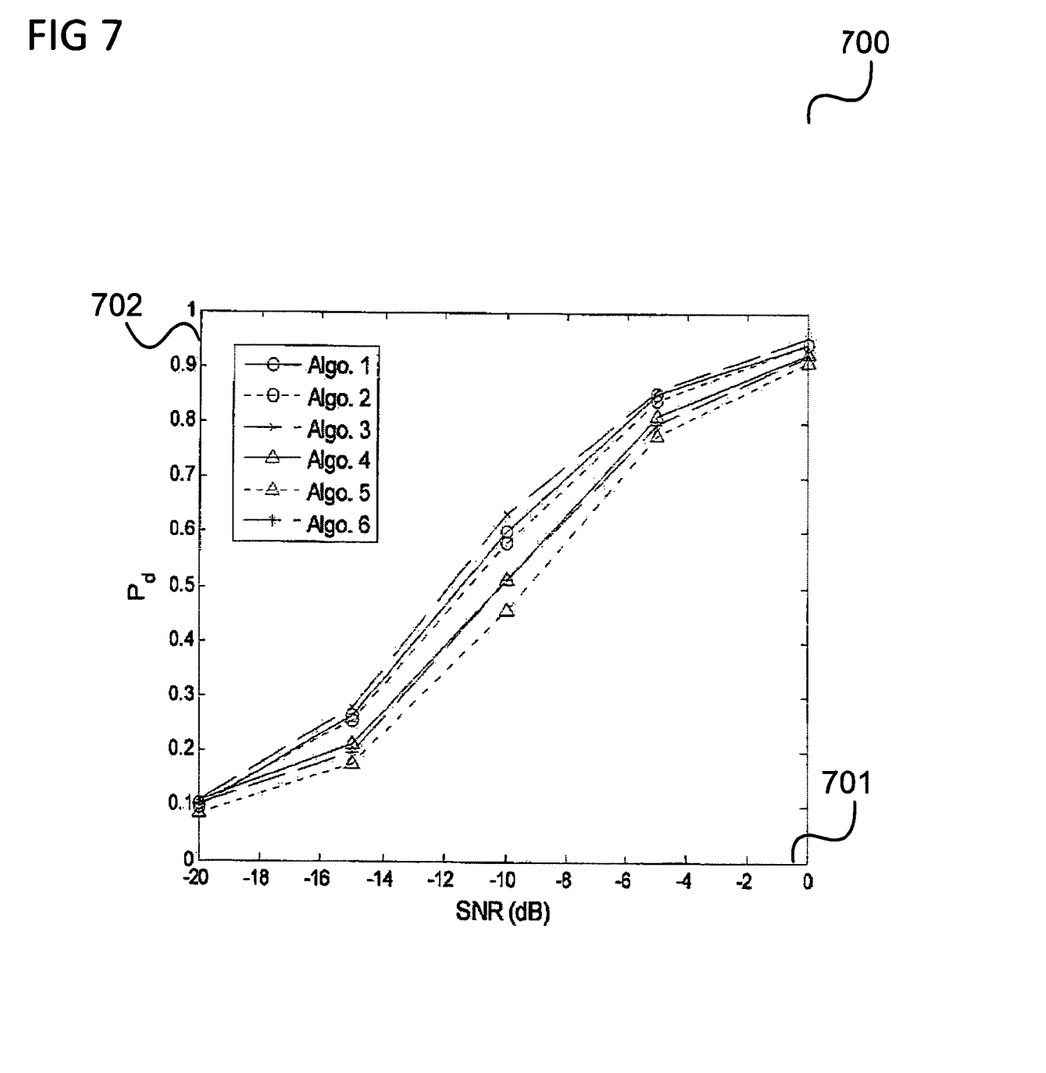

FIG. 7 shows a performance diagram 700 according to an embodiment.

Signal-to-noise ratio (SNR) is indicated along a first axis 701 and detection probability is indicated along a second axis 702.

The diagram 700 shows the performance of the embodiments based on algorithms 1 to 6 in an uncorrelated noise environment. Pre-combining detectors typically provide superior results to post-combining detectors since they exploit the channel information. The results shown also, suggest that the proposed MSDF can provide comparable performance to the cyclic SCF.

Figure 8:
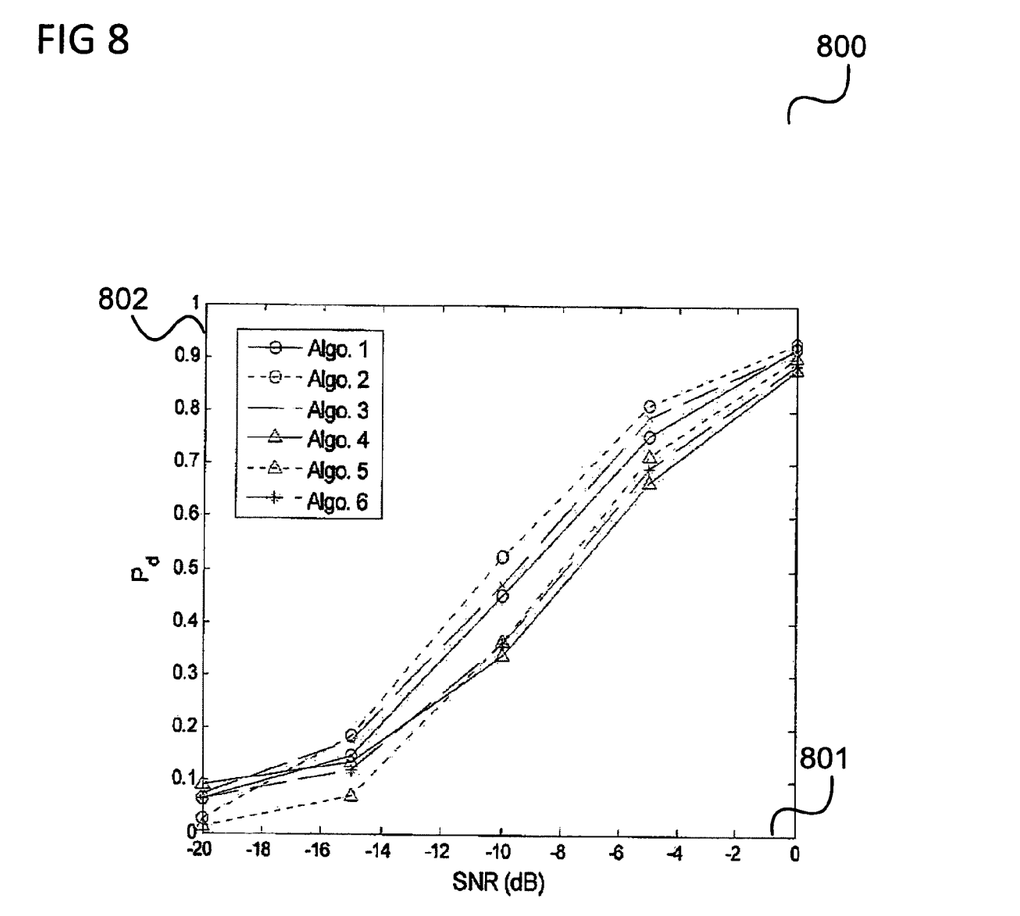

FIG. 8 shows a performance diagram 800 according to an embodiment.

Signal-to-noise ratio (SNR) is indicated along a first axis 801 and detection probability is indicated along a second axis 802.

The diagram 800 illustrates the performance for algorithms 1 to 6 in a temporally correlated noise scenario. The false alarm probability of pre-combining and post-combining detectors is shown in table 1 as follows.

TABLE 1

False alarm probability in correlated noise scenario

| | Algorithm | | | | | |
|---|---|---|---|---|---|---|
| | 1 | 2 | 3 | 4 | 5 | 6 |
| $P_{fa}$ | 0.067 | 0.021 | 0.092 | 0.081 | 0.01 | 0.067 |

All false alarm rates are lower than the pre-determined one suggesting that all detectors are effective against the effect of noise correlation.

Figure 9:
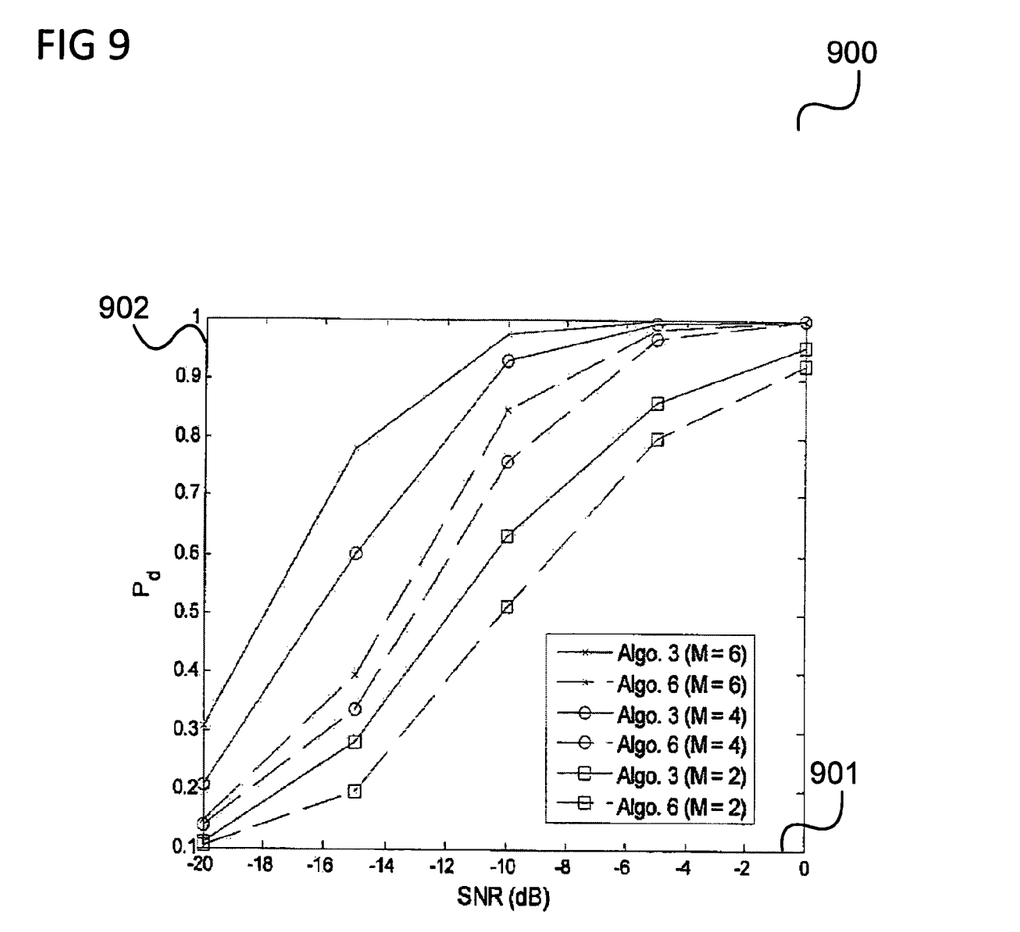

FIG. 9 shows a performance diagram 900 according to an embodiment.

Signal-to-noise ratio (SNR) is indicated along a first axis 901 and detection probability is indicated along a second axis 902.

The diagram 900 illustrates the effect of the number of receiving antennas on the detection rate in an uncorrelated noise environment. Only the results of algorithm 3 and algorithm 6 are shown. The number of antennas, M, is set to 2, 4, and 6. The outcome indicates that as the number of antennas increases the performance gap between the pre-combining method and the post-combining method increases. A reason for this may be seen in that pre-combining detectors achieve a higher gain from exploiting channel knowledge while post-combining detectors have not channel information of which advantage can be taken.

The invention claimed is:

1. A method for spectrum sensing comprising:
   receiving a signal using a plurality of receive antennas;
   forming a set of received signals including the received signal of each antenna;
   determining a cyclic auto-correlation of the set of received signals;
   estimating, for each receive antenna, channel state information of the radio channel via which the receive antenna receives the signal based on the determined cyclic auto-correlation;
   performing maximum ratio combining of the received signal samples based on the estimated channel state information;
   determining a measure of the cyclostationarity of the received signal based on the result of the maximum ratio combining; and
   performing cyclostationarity detection spectrum sensing based on the determined measure of the cyclostationarity of the received signal.

2. Method for spectrum sensing according to claim 1, wherein the set of received signals is a received vector signal wherein the components of the received vector signal are the signals received via the antennas.

3. Method for spectrum sensing according to claim 1, wherein determining the cyclic auto-correlation includes determining a cyclic auto-correlation matrix of the set of received signals.

4. Method for spectrum sensing according to claim 3, wherein estimating the channel state information of the radio channel includes determining eigenvalues of the cyclic auto-correlation matrix.

5. Method for spectrum sensing according to claim 4, wherein the channel state information is determined as the components of the eigenvector corresponding to the maximum eigenvalue of the cyclic auto-correlation matrix.

6. Method for spectrum sensing according to claim 1, wherein the cyclic auto-correlation is determined for a candidate cycle frequency.

7. Method for spectrum sensing according to claim 1, wherein the signal is received using the plurality of receive antennas to generate a plurality of received signal samples for each receive antenna.

8. Method for spectrum sensing according to claim 7, wherein determining the cyclic auto-correlation includes determining the correlation between signal samples of different antennas for the same sampling time.

9. Method for spectrum sensing according to claim 1, wherein the measure of the cyclostationarity of the received signal is determined based on the cyclic spectral density function or the cyclic spectral coherence function.

10. Method for spectrum sensing according to claim 9, wherein the measure of the cyclostationarity of the received signal is determined based on the cyclic spectral density function scaled by an average energy of the received signal.

11. Method for spectrum sensing according to claim 1, wherein determining the measure of the cyclostationarity includes an averaging over a plurality of radio frequencies or determining the maximum over a plurality of radio frequencies.

12. Method for spectrum sensing according to claim 1, wherein cyclostationarity detection spectrum sensing is performed by comparing the measure of cyclostationarity with a pre-determined threshold.

13. Method for spectrum sensing according to claim 12, further comprising deciding that a primary user is present if the measure of cyclostationarity is above the pre-determined threshold.

14. A communication device comprising:
   a receiver configured to receive a signal using a plurality of receive antennas and to form a set of received signals including the received signal of each antenna;
   a determining circuit configured to determine a cyclic auto-correlation of the set of received signals;
   an estimator configured to estimate, for each receive antenna, channel state information of the radio channel via which the receive antenna receives the signal based on the determined cyclic auto-correlation;
   a combiner configured to perform maximum ratio combining of the received signal samples based on the estimated channel state information; and
   a spectrum sensing circuit configured to determine a measure of the cyclostationarity of the received signal based on the result of the maximum ratio combining and to perform cyclostationarity detection spectrum sensing based on the determined measure of the cyclostationarity of the received signal.

15. A method for spectrum sensing comprising:
   receiving a signal using a plurality of receive antennas;
   determining for each receive antenna a measure of the cyclostationarity of the received signal of the antenna;
   combining the measures of the cyclostationarity of all receive antennas; and performing cyclostationarity detection spectrum sensing based on the combined measures of the cyclostationarity of all receive antennas;

wherein the measure of the cyclostationarity of the received signal of the antenna is determined based on the cyclic spectral coherence function.

16. Method for spectrum sensing according to claim 15, wherein combining the measures of cyclostationarity includes summing the measures of cyclostationarity.

17. Method for spectrum sensing according to claim 15, wherein performing cyclostationarity detection spectrum sensing includes determining an overall measure of cyclostationarity from the combined measures of cyclostationarity and comparing the overall measure of cyclostationarity with a pre-determined threshold.

18. A communication device comprising:
a receiver configured to receive a signal using a plurality of receive antennas;
a determining circuit configured to determine for each receive antenna a measure of the cyclostationarity of the received signal of the antenna;
a combiner configured to combine the measures of the cyclostationarity of all receive antennas; and
a spectrum sensing circuit configured to perform cyclostationarity detection spectrum sensing based on the combined measures of the cyclostationarity of all receive antennas;
wherein the measure of the cyclostationarity of the received signal of the antenna is determined based on the cyclic spectral coherence function.

* * * * *